Feb. 20, 1934.  J. D. NIES  1,947,533
AUTOMATIC CONTROL FOR MOTORS
Filed June 11, 1931  2 Sheets-Sheet 1
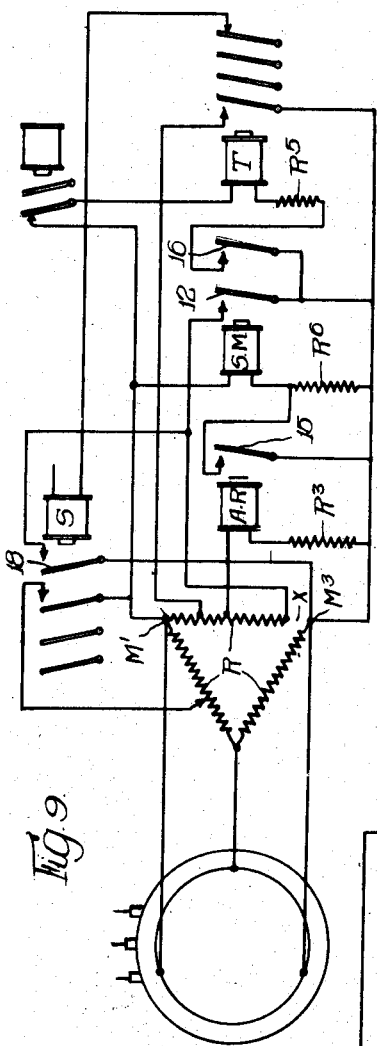
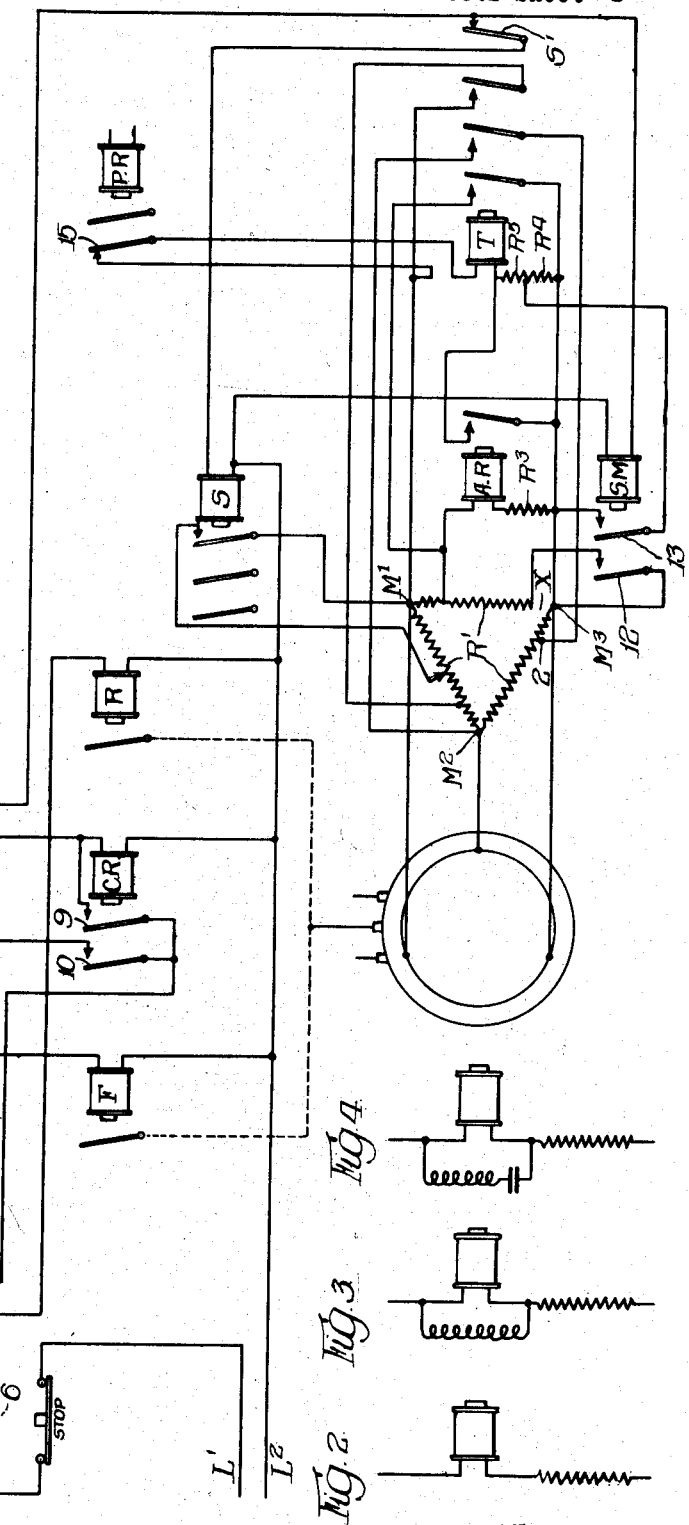
Inventor:
John D Nies.
By Wilkinson, Huxley, Byron & Knight attys.

Feb. 20, 1934.   J. D. NIES   1,947,533

AUTOMATIC CONTROL FOR MOTORS

Filed June 11, 1931   2 Sheets-Sheet 2

Inventor
John D. Nies.
By Wilkinson, Huxley, Byron + Knight
attys.

Patented Feb. 20, 1934

1,947,533

UNITED STATES PATENT OFFICE 1,947,533

AUTOMATIC CONTROL FOR MOTORS

John D. Nies, St. Charles, Ill., assignor to The Kimble Electric Co., Chicago, Ill., a corporation of Illinois Application June 11, 1931. Serial No. 543,517

20 Claims. (Cl. 172—179)

This invention relates to automatic control for motors. Although it has been illustrated as embodied in a system for automatically controlling the rotor resistance during acceleration and slow speed operations of slip ring motors, the invention is applicable to many other uses. The apparatus illustrated includes the combination of a slip ring motor with the usual torque switch, but with this switch controlled automatically from the control circuit instead of from the push buttons.

In another aspect, the invention includes in addition to the above, means for increasing the control resistance and for altering the motor speed at which the torque switch automatically opens.

Numerous objects are accomplished by this invention. A system is provided whereby the action of the torque switch is made entirely automatic, closing and opening under pre-determined motor conditions, and automatically operating in different manners for inching, running and slow speed operations. On the ordinary run operation the torque switch automatically closes at the start, but instead of being opened as formerly upon release of the starting button by the operator, it is opened automatically when the motor speed reaches a pre-determined value. Under the former manual control the torque switch was usually opened either too soon or too late, depending upon the skill or guesswork of the particular operator.

On inching operations where the power is applied intermittently but the movement is usually continuous, a quick acceleration is undesirable, and this invention provides normally for closing the torque switch only when necessary to start the motor or keep it going.

Slow motion operations are sometimes desired, in which the motor runs continuously and fairly uniformly, but at a speed considerably slower than any of the ordinary operating speeds. This invention provides means operative when desired for causing the torque switch to be closed only enough to maintain the motor at such desired slow motion speed, or, alternatively, only when necessary to prevent a stall, the speed being maintained by automatic release of the slow motion switch. This permits the use of more rotor resistance than could otherwise be used without occasional stalling.

With these and various other objects in view, the invention may consist of certain novel features of construction and operation, as will be more fully described and particularly pointed out in the specification, drawings and claims appended hereto.

In the drawings, which illustrate an embodiment of the device, and wherein like reference characters are used to designate like parts, Figure 1 is a diagrammatic illustration of the control for a slip-ring motor embodying a preferred form of this invention;

Figures 2, 3 and 4 are diagrammatic illustrations of modified relay circuits which may be suitably actuated by the rotor circuit;

Figure 9 illustrates a control similar to Figure 1 but with the slow motion switch controlled automatically.

Figure 5:
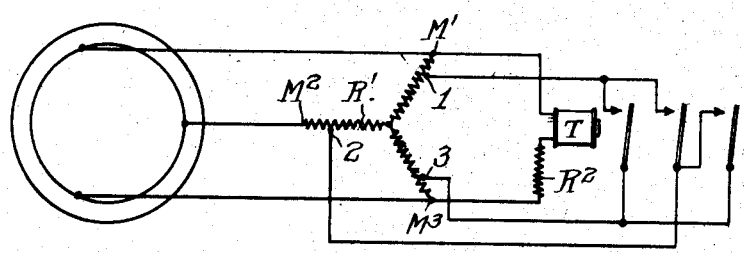
Figures 5 and 6 illustrate basic connections for the automatic torque switch with star and delta control resistances, respectively.

Although this invention may take many forms, only a few have been chosen for illustration. The preferred and more complete form is illustrated in Figure 1. In this figure also is illustrated, very diagrammatically, a suitable button type of control system, such as may be used with this invention. As illustrated, this system includes Inching, Reverse, Run and Stop buttons as designated by name in the drawings. These buttons control the forward magnetic switch F, the reverse magnetic switch R, the control relay CR with its two auxiliary contacts, and the speed selecting magnetic switch S. There is also the usual torque magnetic switch T, but its usual control, through contacts 6, has been replaced by this invention. It is to be understood that although only the coils and auxiliary contacts have been fully shown, each coil, except CR would operate switches in the motor and resistance circuits, as in any customary manner.

In inching the inch button is depressed, thus closing the forward switch F which remains closed as long as the button is held depressed. In running, the run button is depressed and then released. Control relay CR closes when the button is depressed. Control relay CR maintains itself closed by current carried through its stick contact 9, and maintains forward switch F closed by current carried through its contact 10. When the run button is fully released, current carried through its upper contacts closes speed selecting switch S. During the run relay CR and switches F and S remain closed.

The function of the switch S is to connect the rotor terminals to predetermined points in the control resistor, thus causing the motor to run at a predetermined speed. Several such switches may be used in the same control.

The function of the torque switch T is to connect the rotor terminals to certain selected points in the control resistor thus causing the motor to start with predetermined torque. In former control systems this switch was closed whenever any of the operating buttons was depressed, regardless of whether or not this was desirable in view of the status of the motor at the moment. On account of this the torque switch remains closed during a time which is extremely variable depending as it does upon the opinion or the skill of the person operating the equipment. There are many objections to this besides the inconvenience of holding the button pressed. One of them is that the torque switch may be closed too short a time to effect the desired positive start. A second objection is that the torque switch may remain closed too long in which case it would carry the motor up to perhaps 80% of normal full speed, when only half speed was desired. A third objection is that when the equipment is being "inched" or "jogged", the torque switch always closes at each successive application of power, although such closure is usually undesirable except on the first pressure of the button during an inching operation. This is true for the reason that inching operations normally should have slow speed, and it is hard to keep the speed from rising unduly if the torque switch closes upon each pressure of the button. It is desirable, in initiating an inching process, to have the torque switch close on the first depression of the button, so as to insure positive starting of the rotor, but not on the subsequent depressions of the button, unless such closure is necessary to keep the load in motion.

The present invention affords means whereby the action of the torque switch is made entirely automatic so that it closes when necessary but not otherwise, and further so that it automatically distinguishes between inching and running operations.

On a run operation, the torque switch automatically closes and remains closed until the motor is up to the speed at which rheostatic control usually begins, say 50% of full speed, or other desired value, and upon attainment of this speed, it automatically opens.

On an inch operation, forward or reverse, the torque switch closes automatically and remains closed only until the desired inching speed is attained, which speed may be for example 20% of the full rated speed of the motor, upon which the torque switch opens. On depressing the inch button the second time in the same inching operation, the torque switch will not close again until the speed has fallen to say 5% of full speed.

To accomplish these results, the coil of the torque switch is supplied with current derived from the rotor. Both the voltage and the frequency of this current vary with the speed of the rotor. As is well known in the art, a simple magnetic switch or relay of suitable design, if connected to the rotor and closed, may remain closed over practically the entire range of rotor speeds, both forward and reverse, for the reason that the change in voltage offsets the effect of the change in frequency.

In the present invention it is desired to have the torque switch open automatically at predetermined rotor speed or speeds. This can be accomplished by connecting impedances in series with the coil, or by connecting impedances in shunt as well as in series with the coil, in such a way as to make the operation, particularly in opening or unsealing of the switch, more sensitive to voltage than to frequency. Some of the suitable arrangements are shown in Figures 2, 3 and 4.

Figure 2 shows a simple resistance connected in series with the coil, which is probably the preferable arrangement.

Figure 3 shows a reactance in parallel with the coil, and a resistance in series with the combination.

Figure 4 shows a reactance and condenser in parallel with the coil, and a resistance in series with the combination. Obviously many other arrangements can be devised.

Figure 6:
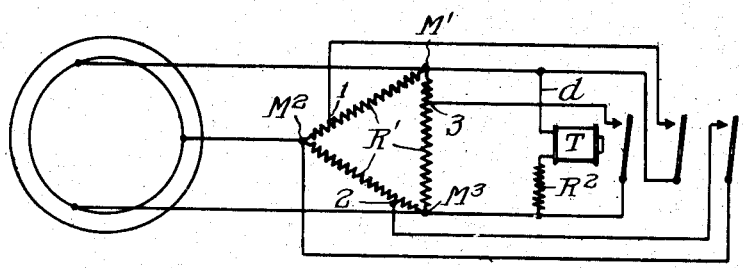

Figures 5 and 6 show a torque switch T connected for automatic acceleration. In the former the control resistance R' is shown star connected. It is provided with taps 1, 2, and 3. When torque switch T is closed, one contact joins 1 to 2, a second joins 2 to 3, a third joins 3 to 1. If desired, one of these contacts may be omitted, or the three may be used to join 1, 2 and 3 to a common neutral. In Figure 6 the resistor is shown delta-connected. When torque switch T is closed, its three fingers join $M^3$ to 3, $M^2$ to 2, and $M^1$ to 1. The coil of the torque switch T is connected to any two of the rotor terminals, as $M^1$, and $M^3$, with the impedance $R^2$ in series. As heretofore stated, any combination of impedances can be used, series or shunt connected, but in this illustration a simple resistance is used, in series with the coil, and so selected in relation to the characteristics of the switch as to permit the latter to close on the voltage and frequency received by it from the rotor at standstill, but to open on the voltage and frequency received at some predetermined speed. The adjustment of the switch to perform as indicated can be effected in various ways, as for example, by adjusting the magnetic gap of the switch as to form or distance, by adjusting the associated impedance, or by the use of springs or weights mechanically attached to the switch armature.

Upon energization of the stator of the motor, the loaded stand-still voltage will appear at the terminals of the control resistor $M^1$, $M^2$ and $M^3$. The torque switch T is adjusted to close on this voltage. This adjustment is accomplished by adjusting the impedance associated with the coil, as for example the resistance $R^2$, or by adjustment of springs, or by other means. As soon as the torque switch T closes, it cuts out a suitable part of the control resistor for starting, thus giving the motor the requisite starting torque. As the speed rises, the voltage and the frequency delivered by the rotor to coil T both fall, and as heretofore outlined, the torque switch automatically opens at any predetermined rotor speed. If desired, a contact (as S' in Figure 1) can be added to the torque switch, this contact to be closed when this torque switch is open, and the current for actuation of switches or other devices for controlling the speed of the motor can be taken through this contact, so that these speed controlling devices are automatically held out of action until the torque switch opens.

In the process just described, the rotor voltage falls somewhat when the switch closes, due to additional load resulting from cutting out part of the control resistor. This natural fall of voltage may be of advantage, in reducing the spread between the closing and the opening of the switch. This could be emphasized if desired, by connecting one terminal of the coil T, as for example wire $d$ in Figure 6, to some point along the control resistor intermediate between $M^1$ and $M^3$, instead of to $M^1$ as shown. Assume for example that this point is half way between $M^1$ and $M^3$, then when the switch T closes, its coil will receive one half of the voltage delivered from the rotor, which will reduce the spread between closing and opening. Obviously the spread between opening and closing can by this means be reduced to any desired figure, even to the extent of causing the switch to open immediately after its closure. The same expedient can be adopted for the connection of the relays shown in the remaining figures.

Obviously, by providing $R^2$ or the equivalent impedance, with taps, the amount of resistance or impedance in series with the coil can readily be varied so that the switch will open at a number of different rotor speeds, should that be desired. However, the adjustments required may be somewhat critical and it is generally better to use an auxiliary relay, known in the following as an accelerating relay, and marked AR in Figures 1, 7 and 8.

Figure 7:
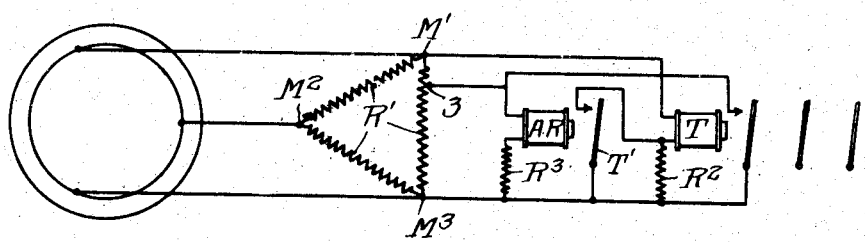
Figures 7 and 8 illustrate the control of the torque switch with the aid of an additional relay, the relay being connected in parallel in Figure 7 and connected in series in Figure 8.

Figure 7 shows the torque switch T and an accelerating relay AR. One object of using the relay is that it is thereby made practical to have a wider separation between the cut-in and cut-out speeds of the torque switch T. The connections of the torque switch contact fingers are the same as in Figure 5, and the same is true of the connections of the coil of the switch, with the exception that the switch is arranged to be closed by aid of the relay AR and its contact $T'$.

The coil of the relay AR is preferably connected across that portion of the phase $M^1$—$M^3$ of control resistance $R'$ that is cut out of circuit by the closure of the torque switch, namely $M^3$ to 3. A resistance $R^3$ is placed in series with the AR coil, and is adjusted to a suitable value so that relay AR will close by reason of the normal voltage drop between 3 and $M^3$, with the rotor at standstill, but will not close after the rotor has reached a comparatively low speed, for example 10% of full speed. The operation is as follows:

When the stator is initially energized from normal line voltage by closing switch F or R, the normal rated standstill voltage of the rotor appears at terminals $M^1$, $M^2$, $M^3$ on the control resistance. The voltage drop between $M^3$ and 3 is sufficient to cause AR to close, thereby closing contact $T'$. Closure of contact $T'$ short circuits resistance $R^2$ in series with the coil of torque switch T, and thereby places T directly across full rotor voltage, thus causing switch T to close. As soon as T closes, its contact short circuits the voltage previously existing across the section $M^3$—3 of the resistance, and thus causes AR to open, and this condition persists as long as the torque switch remains closed. Opening AR re-introduces $R^2$ in series with T. The value of $R^2$ is selected so as to cause the torque switch T to open at a desired rotor speed, presumably about forty percent of full speed. The torque switch then opens, but the voltage of the rotor is now too low to re-close AR, so that T and AR both remain open during subsequent running of the motor.

During an inching operation, the inch button is usually depressed a number of times in rapid succession. The first depression of the button occurs, of course, with the rotor standing still, the torque switch thereupon closes as above described and remains closed as long as the button is held down, if, as usual, this is only for a very short time. When the button is released the AR and T relays both open. The succeeding depression of the button usually occurs when the rotor has some speed. If this speed is sufficiently high, say twenty percent of full speed, the relay AR will not close and therefore the torque switch will not close. In actual practice, the torque switch closes usually on the first one or two depressions of the inch button during any one inching operation; after that it does not again close, unless during the same inching operation the speed falls to the cut-in point of the relay AR. As a result of this action, the torque switch closes only when its closure is needed to maintain motion of the load, but does not close when a certain low speed has been reached, and therefore it is easier to keep the inching speed under control during inching operation.

The structure of Figure 7 has been included in Figure 1, which also shows the typical control relays, including the speed control switch S which is energized when the run button is in release position and the contact $S'$ closed by release of the torque switch. The speed control switch operates three contacts, one for each phase. The circuit of one of these contacts, which is typical of the others, has been diagrammatically represented as comprising a shunt for a variable portion of the control resistor $R'$.

In former control systems of this type, the ordinary slow speed may be brought into action after the motor has been started by merely locking the run button down in a middle position where both its upper and its lower contacts remain open. This causes speed selector switch S to open, thus inserting the entire control resistor into the rotor circuit and causing the speed to take minimum value, ordinarily 40 to 50 percent of maximum. In certain motor applications it is desired to obtain a speed reduction down to say 20% of maximum. This can be done by the insertion of sufficient resistance in the rotor circuit. The objection, however, arises in practice, that the action of the motor becomes erratic when so much resistance is used in the rotor circuit. For example, a very small increase in the load will stall the motor, and conversely, a very small decrease in the load would cause its speed to rise materially. This action in securing a continuous slow motion, is to be distinguished from the action previously described, which occurs during inching in which power is applied intermittently.

In Figure 1, the control resistance is shown delta connected, and is understood to have such value as to give a speed with normal load of say forty or fifty percent of maximum. To secure additional speed reduction, it is necessary to insert additional resistance. In Figure 1, the effect of additional resistance is secured by merely opening one phase, in this case the phase $M^1$ $M^3$ of the delta connected rheostat, which is arranged to be opened at X by the released contact 12 of slow motion switch SM. This has the effect of increasing the equivalent resistance by fifty percent. The same effect could of course be accomplished by inserting additional resistance in each phase, and this could be done with either a delta or a star connected resistance. The slow motion switch shown has another contact 13, which when closed, shunts across resistance $R^4$, which is a part of the resistance or more generally, impedance, connected in series with the coil T. The coil of the switch SM is connected to the main control system of the motor in such a way that SM is supplied with line voltage at all times the equipment is in use, except when the slowest motion is called for. In different systems, this slowest motion may be called for by pressing a button, or by any other suitable means. In the form illustrated, the coil of slow motion switch SM is energized whenever the run button is in its full release position. If the run switch is locked in intermediate position, both switches S and SM are opened. When the current is in any such manner cut off from SM, contact 12 opens, thus breaking one side of the delta in Figure 1, and causing the resistor to operate on open delta, thus in effect adding fifty percent to the resistance in circuit. At the same time, contact 13 opens and introduces $R^4$ as additional resistance in series with T. Assume the motor to be running at the time, and assume the load to be sufficiently heavy to slacken the speed toward standstill. Then the accelerating relay AR will close, as previously outlined before standstill is reached, and its closure supplies current through contact T' to the coil of the torque switch T, causing T to close, and as before, its closure deprives the coil AR of current so that AR immediately opens. The effect of the additional resistance $R^4$ in series with T is to cause T to open at say twenty percent of full speed and it does so as soon as the speed has risen to this value. After that the speed may again drift toward standstill, but at the same point as before the switch T will close, and as before will bring the speed up to the assumed desired low value of 20% before it will open. By this means when running on slow motion, the motor will neither stall nor will its speed rise above a low value. Since the break X in the delta is bridged by the torque switch when the latter closes, the presence of this break has no adverse effect on the starting torque of the motor which remains of full effect.

This feature renders it unnecessary to make any delicate adjustment of control resistance for slow speed operation.

Should it be desired to run at any speed within the normal range, the circuit of the coil SM is closed by the outside control, as by release of the run button, thereby closing gap or break X in the delta and cutting out $R^4$ from the resistance in series with T. Upon momentarily pressing a run button, the relay AR will close, thus closing the torque switch as hereinbefore described, and on account of the lesser resistance in series with it, the torque switch will insure a rise in speed up to some relatively high value, as forty or fifty percent of full speed, before it will open.

Therefore in the arrangement of Figure 1, the torque switch can be used to compel an acceleration up to a relatively high speed, after a run button has been depressed, and to insure positive starting in inching, with, however, no tendency to go to high speeds when the inch button is pressed a number of times in rapid succession, and it also insures the maintenance of a relatively slow speed when that is called for.

The torque switch T is preferably provided with a contact S' which is opened when the switch is energized. This contact S' when open, breaks the circuit for speed control switch S so that it may not be energized and may not interfere with the proper functioning of the torque switch.

This invention contemplates the combination of the features described with a dynamic brake system controlled as by the brake operating or plugging relay PR. Suitable means for controlling such a plugging relay are fully disclosed in the applicant's copending application Serial Number 527,928, filed April 6, 1931. Briefly, it may be stated that upon pressing the stop button after a run, the plugging relay PR is energized and causes the reverse switch to close, the rotor circuit maintaining the plugging relay energized until the motor has sufficiently slowed up. In order to prevent closing of the torque switch under such conditions, the torque switch operating circuit is carried through a contact 15 which is opened when the plugging relay is energized. The plugging relay shown is of course merely symbolic of any dynamic brake operating means, controlled in any manner.

The invention described above may be clarified by a review of the operation of the apparatus illustrated in Figure 1. When the run button is pressed, it closes the circuit of control relay CR through wire 5, causing that relay to close contacts 9 and 10. Contact 9 shunts across the run button to maintain control relay CR energized through the reverse button in released position. Contact 10 closes a similar energizing circuit for the forward switch F, thus causing the motor to be rotated forwardly until the control relay contacts 9 and 10 are opened as by pressing the stop or reverse buttons. As soon as current is supplied to the stator and motor by closing the forward switch F the heavy current is induced resulting in a voltage across the rotor resistance R. The accelerating relay AR is energized by this voltage and closes switch T'. This switch shunts out the resistances $R^4$ and $R^5$ so that torque switch T is connected to the rotor without resistance. Torque switch T thus immediately becomes energized, causing its first three contacts to shunt out most of the resistance R' so as to provide the proper accelerating torque for the motor. As the accelerating relay AR is connected across the resistance $M^3$—3 thus shunted out, this relay immediately becomes de-energized, thereby throwing resistances $R^4$ and $R^5$ into series with the torque switch 2. This resistance is of such value that the torque switch opens at forty or fifty percent full speed. When torque switch T opens, it closes its contact S so that current may be supplied through wire 5 to the speed control switch S and the slow motion switch SM. The slow motion switch through its contact 12 closes the gap in the control resistance R. The speed control switch S shunts out a varying amount of the control resistance, as indicated diagrammatically, for one phase, by the sliding contacts.

If it is desired to run the motor at slow motion, the run button is pressed to intermediate position, opening the energizing circuits of switches S and SM. The de-energizing of switch SM permits contact 12 to open, thereby opening one phase of the rotor resistance and in effect increasing the resistance fifty percent. This will usually result in a slackening motor speed, but before it reaches a stall, the relay AR will close, resulting in the closing of the torque switch T, which will let relay AR open and cause the motor to pick up speed until it reaches twenty percent of full speed. At this speed the combined resistance $R^4$ and $R^5$ will cause torque switch T to open and the motor will again be on slow motion as before.

Figure 8:
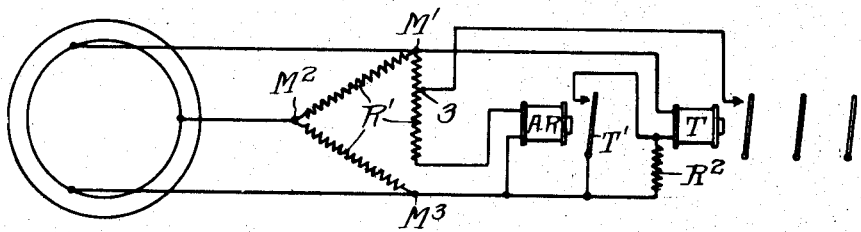

In the arrangements discussed heretofore in this application, the accelerating relay AR has been shown as adapted to operation on voltage, that is, shunt wound, and likewise shunt connected. With these arrangements the acceleration is responsive mainly to motor speed. Figure 8 illustrates the use of an accelerating relay adapted for current operation, that is series wound, and connected in series with one phase of the control resistor. In Figure 8, AR closes in response to the initial inrush of rotor current. Closure of its contact 1 closes the torque switch T. Closure of the latter cuts out part of the control resistance for starting, and the part cut out includes the AR coil. On account of this, AR opens, thus leaving T subject only to rotor voltage and frequency. As before, the resistance or impedance $R^2$ in series with T is adjusted to permit T to open at some predetermined rotor speed. When T opens, AR is reintroduced into circuit but normally by this time the current is too small to reclose AR. The arrangement in Figure 8 provides acceleration which is responsive to load.

Figure 9 illustrates another form of the invention. In this form the slow motion relay has been shown as controlled by the rotor circuit. The accelerating relay may be substantially the same as that in Figure 1 except that it may be connected directly across the gap X so that it will open whenever the gap is shunted as by closing the contact 12 of slow motion switch SM. Preferably, however, its upper connection is taken to a point on the resistance, as shown, sufficiently removed from the gap X so that when the gap is closed the relay will open slowly, to prevent a possible chattering of the relays. Resistance $R^3$ in series with relay AR may be of such value that if the motor is running with the gap X open the switch AR will close when the motor drops to say ten percent of its full speed. The slow motion coil SM is connected across the rotor terminals $M^1$ and $M^3$ but normally with the resistance $R^6$ in series therewith, this resistance being such as will cause the slow motion switch to open when the motor speeds up to say twenty percent of full speed.

When the speed drops to the cut-in point, or during starting, accelerating relay AR is closed by the voltage across the gap X and closes its contact 15. This shunts resistance $R^6$ and causes the slow motion switch SM to close immediately. As soon as the slow motion switch is closed it closes gap X and so reduces the voltage across the accelerating relay AR that the latter releases the contact 15 to reinsert resistance $R^6$ into series with the slow motion coil SM. The energization of the slow motion coil SM also causes the pick-up of contact 16 to connect the torque switch. The torque switch is thus connected across the rotor terminals $M^1$ and $M^3$ with resistance $R^5$ in series. Resistance $R^5$ is preferably of such value that the torque switch will close only when the speed of the rotor has slowed down below the cut-in speed for the accelerating relay AR. It follows that whenever the motor is being started the torque switch closes. The torque switch opens whenever the slow motion switch opens, since opening of contact 16 breaks the circuit through the torque switch. Of course, if it should be desired that the torque switch stay closed up to forty percent full speed in starting, the torque switch could be operated more independently of the slow motion switch, as along the lines shown in Figure 1.

In order that the gap X will not be open under normal running conditions an extra contact 18 on the speed selector switch S or on each of them if a plurality is provided, is connected as shown to close the gap. Thus whenever the speed selector switch is energized to cause running at any of the ordinary speeds, the gap will be closed by contact 18, as in Figure 1. When the ordinary speeds are not desired the speed selector switch is opened (in Figure 1 by locking the run button in intermediate position). This opens the gap X and the apparatus is ready for the automatic operation of slow motion switch SM. The plugging relay has been provided with an extra contact in series with the torque switch so that the torque switch will not close during plugging. It could similarly control a contact in the circuit for the slow motion switch if desired, but of course neither of these features are essential to the more important aspects of the invention.

An understanding of the structure of Figure 9 will be aided by a description of its operation. When current is applied to the stator as indicated in Figure 1 substantially full rotor voltage will appear across the gap and thereby cause the energization of accelerating relay AR and closing of its contact 15. The voltage across the rotor terminals $M^1$ and $M^3$ will also energize the slow motion switch SM when the resistance $R^6$ is shunted out by contact 15 if not simultaneously with the energization of accelerating relay AR. Energization of slow motion switch SM closes contacts 12 and 16. Contact 12 closes the gap X causing the accelerating relay AR to release contact 15 reinserting resistance $R^6$ into series with slow motion switch SM. Contact 16 connects the torque switch across the terminals $M^1$ and $M^3$ and as all the action so far has taken place almost instantaneously, the rotor is still substantially stationary and the voltage is sufficient to close the torque switch in spite of the resistance $R^5$. As the motor speeds up it reaches the point of say twenty percent of full speed, at which the voltage is so low that the slow motion switch SM releases contacts 12 and 16. Contact 16 breaks the circuit through the torque switch which immediately opens. As the torque switch opens, the speed switch S will close unless slow motion is desired. Closing of speed switch S closes contact 18 which re-closes gap X, which ceased to be closed by the contact 12 when the slow motion switch SM opened.

When slow motion is desired, the switch S is opened, as by locking the run button of Figure 1 in intermediate position. This reopens the gap X increasing the effective resistance of the control resistance $R^1$. This has the effect of reducing the speed to slow motion, as described in connection with Figure 1. In Figure 1, however, if the speed approached a standstill, the torque switch was operated, thus producing a quick acceleration up to the full slow motion value, say 20%. This sudden acceleration was very undesirable, partly because the men working on the press and depending on the slow motion could not be sure that the acceleration would stop at twenty percent. It was also undesirable because the acceleration would terminate very quickly and the slacking down of speed would again commence, so that the torque switch would have to be operated quite frequently.

In Figure 9 when the speed drops to the predetermined value—say ten percent of full speed, accelerating relay AR closes (the gap being opened as described), closing contact 15 and shunting out resistance $R^6$. This immediately closes contacts 12 and 16 of slow motion switch SM. Contact 12 as before, closes gap X and causes the opening of accelerating relay 15. Closing the gap X, however, has the additional effect of materially reducing the control resistance R. This will almost always cause a sufficient decrease in the resistance to enable the motor to again pick up speed, but the acceleration will be very gradual instead of sudden, with the result that it will not bother the workmen, and because of the fact that the acceleration takes considerable time only a comparatively small portion of such accelerations will be necessary, thus reducing the deterioration of the switches.

In the rare event that this reduction of resistance is not sufficient and the speed continues to drop, before the motor stalls the voltage across $M^1$, $M^3$ increases sufficiently to operate the torque switch T through the contact 16 and the resistance $R^5$. Thus it is seen that the torque switch is closed only in starting, or to prevent a stall.

The above described invention, with its various forms and aspects, may be arranged to automatically control a slip ring polyphase motor in any manner desired, and it should be realized that the term "polyphase" applies to any motor using currents of different phases, including those of the condenser type. In the illustrated forms of the invention, means are provided for automatically controlling the torque switch, both for starting and to prevent a stall, and also for automatically controlling a slow motion relay or other speed control relay in like manner.

It is to be understood that many other embodiments of the invention, including some in improved form, will be apparent, and in the course of time more will be devised by those skilled in the art. It is not desired that this invention be limited to the details described, for its scope includes all such forms or improvements as come within the spirit of the following claims, construed as broadly as the prior art will permit.

What is claimed is:

1. The combination with a polyphase slip-ring motor including a rotor, of a resistance for controlling said motor, a magnetic switch having contacts for rendering effective a predetermined portion of said resistance only of a suitable value for providing the desired starting torque, and having an operating coil, said coil being in and controlled by the rotor circuit.

2. The combination with a polphase slip-ring motor including a rotor, of a resistance for controlling said motor, a magnetic switch having contacts for regulating said resistance and having an operating coil, said coil being in and controlled by the rotor circuit, and an impedance at times in circuit with said coil and having a value to cause said switch to open at a predetermined rotor speed.

3. The combination with a polyphase slip-ring motor including a rotor, of a resistance for controlling said motor, a magnetic switch having contacts for rendering effective a predetermined portion of said resistance only of a suitable value for providing the desired starting torque and an operating coil, said coil being in and controlled by the rotor circuit and at times having an impedance in series therewith.

4. The combination with a polyphase slip-ring motor including a rotor, of a resistance for controlling said motor, a magnetic switch having contacts for regulating said resistance and having an operating coil, said coil being in and controlled by the rotor circuit, and an impedance at times in circuit with said coil and having a value to cause said switch to open at a pre-determined rotor speed, and means at times effective for decreasing the value of said impedance.

5. The combination with a polyphase slip-ring motor including a rotor, of a resistance for controlling said motor, a magnetic switch having contacts for rendering effective a predetermined portion of said resistance only of a suitable value for providing the desired starting torque and an operating coil, said coil being completely controlled by the rotor circuit, an impedance at times in circuit with said coil and having a value to cause said switch to open at a predetermined rotor speed, and means at times effective for decreasing the value of said impedance.

6. The combination with a polyphase slip-ring motor including a rotor, of a resistance for controlling said motor, a magnetic switch having contacts for rendering effective a predetermined portion of said resistance only of a suitable value for providing the desired starting torque and an operating coil, said coil being connected in circuit with said rotor, an impedance at times in circuit with said coil and having a value to cause said switch to open at a predetermined rotor speed, and means at times effective for decreasing the value of said impedance.

7. The combination with a polyphase slip-ring motor including a rotor, of a resistance for controlling said motor, a magnetic switch having contacts for regulating said resistance and having an operating coil, said coil being controlled by the rotor circuit, means for at times connecting said coil directly across a part of said resistance, and means for at other times connecting it across part of said resistance through an impedance whereby said switch will open when the voltage across said part of the control resistance drops below a predetermined value.

8. The combination with a polyphase slip-ring motor including a rotor, of a resistance for controlling said motor, a magnetic switch having contacts for regulating said resistance and having an operating coil, said coil being controlled by the rotor circuit, and means for at times connecting said coil across a part of said resistance with not more than a relatively small impedance in series with said coil and for at times increasing the impedance to cause the switch to open under predetermined conditions.

9. The combination with a polyphase slip-ring motor including a rotor, of a resistance for controlling said motor, a magnetic switch having contacts for rendering effective a predetermined portion of said resistance only of a suitable value for providing the desired starting torque and an operating coil, said coil being controlled by the rotor circuit, means for controlling the speed by regulating said resistance, and means operated by said switch for rendering said speed control means inoperative when said switch is operated.

10. The combination with a polyphase slip-ring motor including a rotor, of a resistance for controlling said motor, a magnetic switch having contacts for regulating said resistance and having an operating coil, said coil being controlled by the rotor circuit, and a relay controlled by said rotor circuit and including a contact for causing said switch to close whenever said relay is operated.

11. The combination with a polyphase slip-ring motor including a rotor, of a resistance for controlling said motor, a magnetic switch having contacts for rendering effective a predetermined portion of said resistance only of a suitable value for providing the desired starting torque and having an operating coil, said coil being controlled by the rotor circuit, and a relay controlled by said rotor circuit and including a contact for causing said switch to close whenever said relay is operated.

12. The combination with a polyphase slip-ring motor including a rotor, of a resistance for controlling said motor, a magnetic switch having contacts for regulating said resistance and having an operating coil, said coil being controlled by the rotor circuit, an impedance at times in circuit with said coil and having a value to cause said switch to open at a predetermined rotor speed, and a relay controlled by said rotor circuit and including a contact for at times altering said impedance.

13. The combination with a polyphase slip-ring motor including a rotor, of a resistance for controlling said motor, a magnetic switch having contacts for regulating said resistance and having an operating coil, said coil being controlled by the rotor circuit, a relay controlled by said rotor circuit and including a contact for causing said switch to close whenever said relay is operated, and means operated by said switch for causing said relay to open.

14. The combination with a polyphase slip-ring motor including a rotor, of a resistance for controlling said motor, a magnetic switch having contacts for regulating said resistance and having an operating coil, said coil being controlled by the rotor circuit, a relay controlled by said rotor circuit and including a contact for aiding in causing said switch to close, the constants of said relay and its circuit and of said switch and its circuit being such that the relay will close as the rotor approaches a stall at a higher speed than that at which said switch closes.

15. The combination with a polyphase slip-ring motor including a rotor, of a resistance for controlling said motor, a magnetic switch having contacts for greatly decreasing said resistance and having an operating coil, said coil being controlled by the rotor circuit, a relay controlled by said rotor circuit and including contacts for less greatly decreasing said resistance, the constants of said relay and its circuit and of said switch and its circuit being such that the relay will close as the rotor approaches a stall at a higher speed than that at which said switch closes.

16. The combination with a polyphase slip-ring motor including a rotor, of a resistance for controlling said motor, a magnetic switch having contacts for greatly decreasing said resistance and having an operating coil, said coil being controlled by the rotor circuit, a relay controlled by said rotor circuit and including contacts for less greatly decreasing said resistance and for connecting said operating coil to said rotor circuit.

17. The combination with a polyphase slip-ring motor including a rotor, of a resistance for controlling said motor, a magnetic switch having contacts for rendering effective a predetermined portion of said resistance only of a suitable value for providing the desired starting torque and an operating coil, a relay controlled by said rotor circuit and having contacts for rendering effective a greater given portion of said resistance and for aiding in causing said switch to close, and a cut-in relay controlled by said rotor circuit and operated during the motor operation when said switch and first named relay are open and when said rotor speed is below a predetermined value, to cause said first named relay to close.

18. The combination with a polyphase slip-ring motor including a rotor, of a resistance for controlling said motor, said resistance when fully effective being too great for ordinary runs, a magnetic switch having contacts for decreasing the effective resistance to an amount suitable for ordinary slow speed runs and having a coil, said coil being controlled by the rotor circuit, and manually controlled means for regulating said resistance to a variety of values, said means having the effect of closing said contacts whenever operated.

19. The combination with a polyphase slip-ring motor including a rotor, of a resistance for controlling said motor, a magnetic switch having contacts for rendering effective a predetermined portion of said resistance only and an operating coil, a relay controlled by said rotor circuit and having contacts for rendering effective a greater given portion of said resistance and for aiding in causing said switch to close, and a cut-in relay controlled by said rotor circuit and operated during the motor operation when said switch and first named relay are open and when said rotor speed is below a predetermined value, to cause said first named relay to close.

20. The combination with a polyphase slip-ring motor including a rotor, of a resistance for controlling said motor, a magnetic switch having contacts for regulating said resistance and having a single set of operating coils, said coils being controlled in ordinary operations solely by the rotor circuit, and an impedance at times in circuit with said coil and having a value to cause said switch to open at a predetermined rotor speed.

JOHN D. NIES.